(No Model.)  2 Sheets—Sheet 1.
C. Q. HAYES.
SELF LOADING CART.
No. 475,687. Patented May 24, 1892.
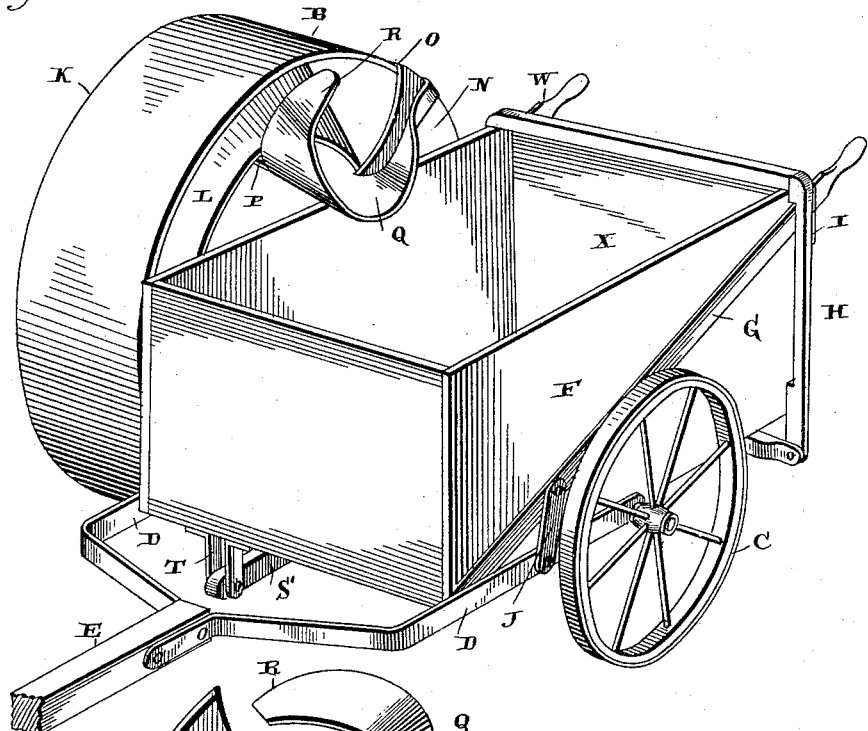
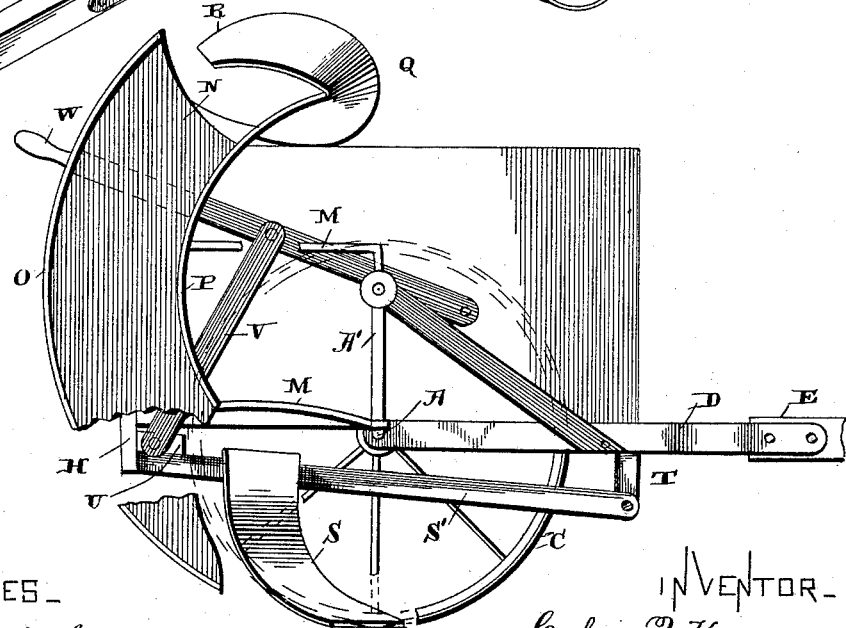

(No Model.) 2 Sheets—Sheet 2.
C. Q. HAYES.
SELF LOADING CART.
No. 475,687. Patented May 24, 1892.
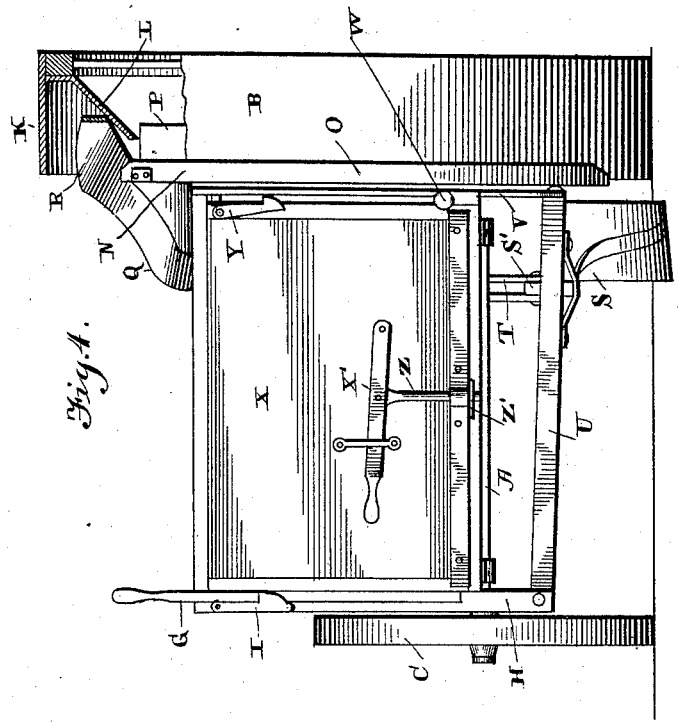
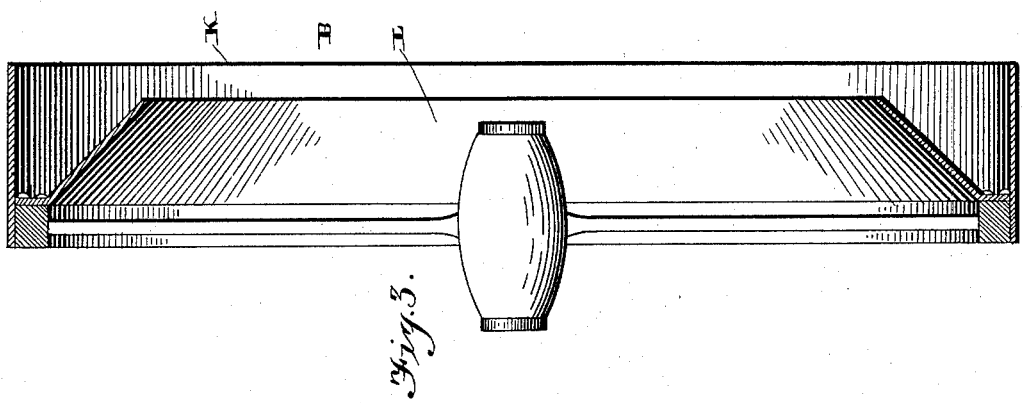
WITNESSES
Geo. E. Frich.
Roland A. Fitzgerald.
INVENTOR
Calvin Q. Hayes
per
Lehmann Pattison & Nesbit
Attys

UNITED STATES PATENT OFFICE.

CALVIN Q. HAYES, OF SIOUX CITY, IOWA.

SELF-LOADING CART.

SPECIFICATION forming part of Letters Patent No. 475,687, dated May 24, 1892.

Application filed December 17, 1891. Serial No. 415,363. (No model.)

*To all whom it may concern:*

Be it known that I, CALVIN Q. HAYES, of Sioux City, in the county of Woodbury and State of Iowa, have invented certain new and useful Improvements in Self-Loading Carts; and I do hereby declare the following to be a full, clear, and exact description of the invention, such as will enable others skilled in the art to which it pertains to make and use it, reference being had to the accompanying drawings, which form part of this specification.

My invention relates to an improvement in self-loading carts; and it consists in certain novel features of construction and in the peculiar arrangement and combination of parts which will be fully described hereinafter, and more particularly referred to in the annexed claims.

The object of my invention is to construct an automatically-loading cart. The load is accumulated in the cart-body by means of a conveyer-wheel, into which the dirt or other matter is thrown by a plow supported beneath the cart-body.

Referring to the accompanying drawings, Figure 1 is a perspective view of my improved cart. Fig. 2 is a side view, the conveyer-wheel being removed. Fig. 3 is a view of the conveyer-wheel detached from the cart. Fig. 4 is a view of the rear end of the cart.

A represents the axle of the cart, which is turned upward at A' to form a spindle for the conveyer-wheel B, and upon the opposite end of the straight portion of the axle is a supporting-wheel C of ordinary size and construction. Extending forward from the axle are the arms D, which are turned inward at their forward ends, and secured to these ends is the tongue E. Loosely supported upon the axle is the body F, and pivoted to one side thereof at its forward end is the lever G, which extends rearward between the cart-body and the guide H, to which latter it is secured in a raised position by a catch I. This lever G is connected by means of a strap J to one of the arms D, and by this means the body is secured in a horizontal position when the lever is raised, and when it is lowered at its rear end the rear end of the body is also lowered and the contents of the cart allowed to dump by means of the incline thus formed.

The wheel B is formed with spokes and a hub of ordinary form, which are bound together by a rim in the ordinary manner. Secured to the rim is a broad tire K, which projects inward toward the cart-body. Secured to the inner side of the wheel B is the flaring or cone-shaped plate L, which being secured to the rim revolves with it and with the broad tire. Thus a circular space is formed within the wheel B, as shown.

M represent arms which extend outward from the upturned end A' of the axle A, and supported by these arms is a circular guide plate or fender N, which in width is the same as the space in the wheel between the tire and plate L. The plate N is formed with a projecting flange O, which extends over the outer side of the tire K, and P represents a correspondingly-curved plate secured to the concave edge of the plate N and which extends into the wheel through the opening in the cone-shaped plate L. By means of this plate N and the projecting flanges on its edges it will be seen that the rear portion of the space in the wheel B is inclosed on both sides, so that matter thrown therein will be conveyed upward on the plate L.

Secured to the upper ends of the plates N and P is the inwardly-extending chute or spout Q, which projects over the edge of the cart-body. The edge of this spout is turned upward, as shown at R, and this upturned portion extends outward into the space formed in the inner periphery of the wheel B, and is so formed as to guide any material which may be raised by the plate L into the spout Q, which in turn conveys it to the cart-body.

S represents a plow, which is pivotally connected at its forward end to the under side of the body F, as shown at T.

The rear end of the plow-beam is secured to a bar U, which is pivoted at its outer end to the lower end of the guide H and connected at its inner end by means of a strap V to the pivoted operating-lever W, which is secured to the side of the body F. The rear end of this lever is held in a raised position by a catch Y, and by this means the plow is elevated and prevented from engaging the ground.

As will be seen, the plow is located alongside the lower edge of the wheel B, so that when it is lowered into the ground it will throw the earth into the space in the said wheel, and the wheel in its forward revolution will convey the same upward into the spout Q, which will discharge it into the cart-body. The operation of loading is thus accomplished automatically, and when a sufficient quantity of dirt or gravel has been collected the plow is raised from its engagement with the ground and the cart is free to move to any desired point with its load.

The end-gate X is hinged at its upper end to the rear of the body F, and pivoted to the outer side of the gate is the lever X', to which is connected the downwardly-extending rod Z, which when lowered extends into or engages a projecting plate Z', secured to the floor of the body. By this means the end-gate is securely closed. When it is desired to dump the cart, the lever X' is raised and the gate is then free to swing upward.

Having thus described my invention, I claim—

1. In a self-loading cart, the combination, with a cart-body, a support therefor, and a plow, of a conveyer-wheel adjacent said plow, a curved plate N, adjacent the inner side of the wheel, outwardly-extending plates secured to the respective edges of the plate N and which conform to the curvature of the conveyer-wheel, and a spout, substantially as shown and described.

2. In a self-loading cart, a body, an axle having an upturned portion A', curved plate N, supported by said upturned portion, a conveyer-wheel, a plow, and a chute, the parts being combined to operate substantially as shown and described.

3. In a cart, the combination, with the axle and the arms D, of the body loosely mounted on said axle, a lever pivoted to the body, a connection between the lever and one of the arms D, and a means for securing the rear end of the lever to the body, for the purpose substantially as shown and described.

4. In a self-loading cart, the combination, with the body, a support therefor, and a conveyer-wheel, of a plow loosely connected at its forward end to the under side of the body, depending support H, bar U, pivoted thereto and to which the rear end of the plow-beam is connected, an operating-lever on the side of the cart-body, and a connection between the said lever and the bar U, substantially as shown and described.

In testimony whereof I affix my signature in presence of two witnesses.

CALVIN Q. HAYES.

Witnesses:
T. E. HAYES,
E. B. CRAWFORD.